Jan. 31, 1950    E. K. PETERSON    2,495,943
TRUCK
Filed Dec. 10, 1945    3 Sheets-Sheet 1
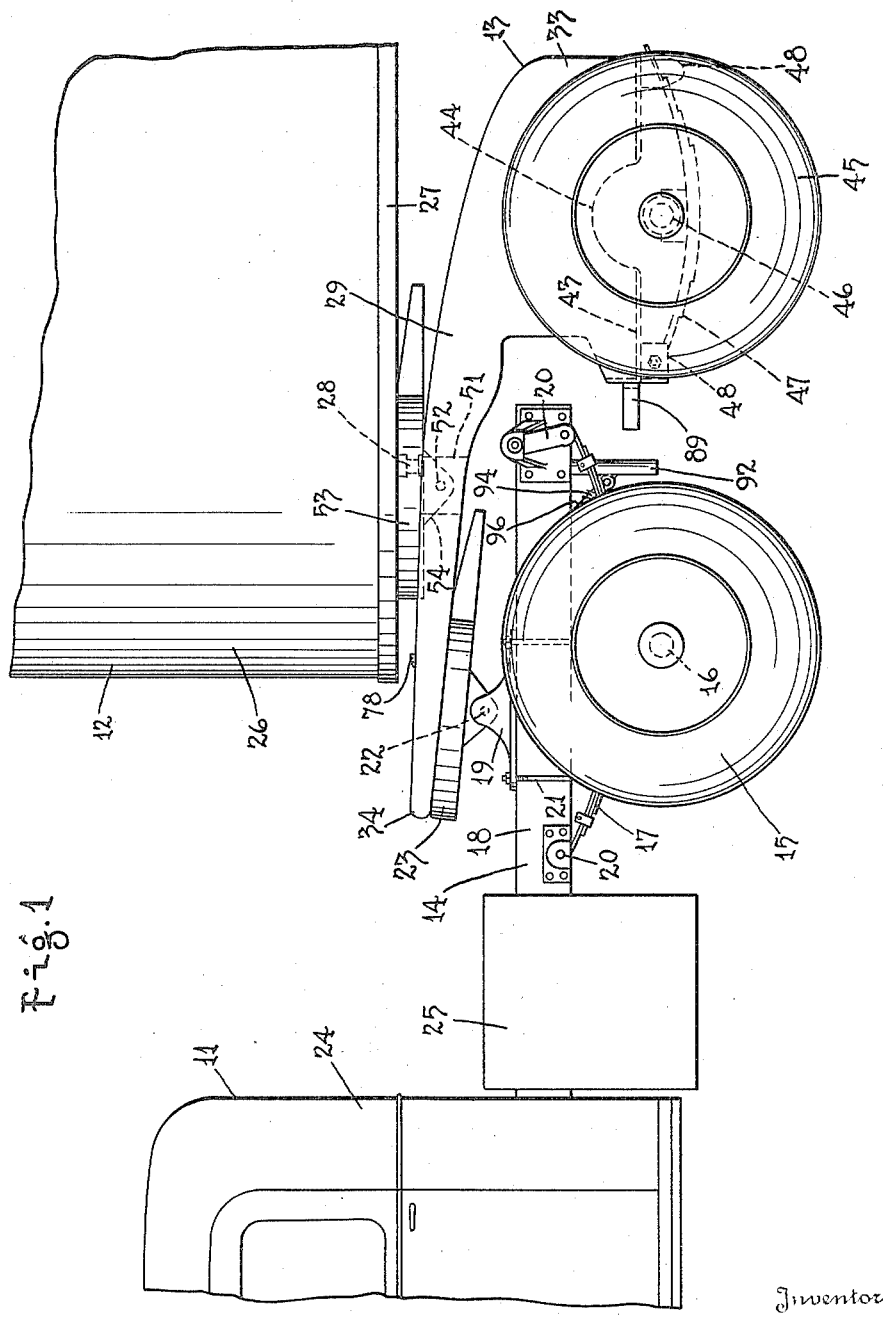
Inventor
Earl K. Peterson
By Caswell & Lagaard
Attorneys

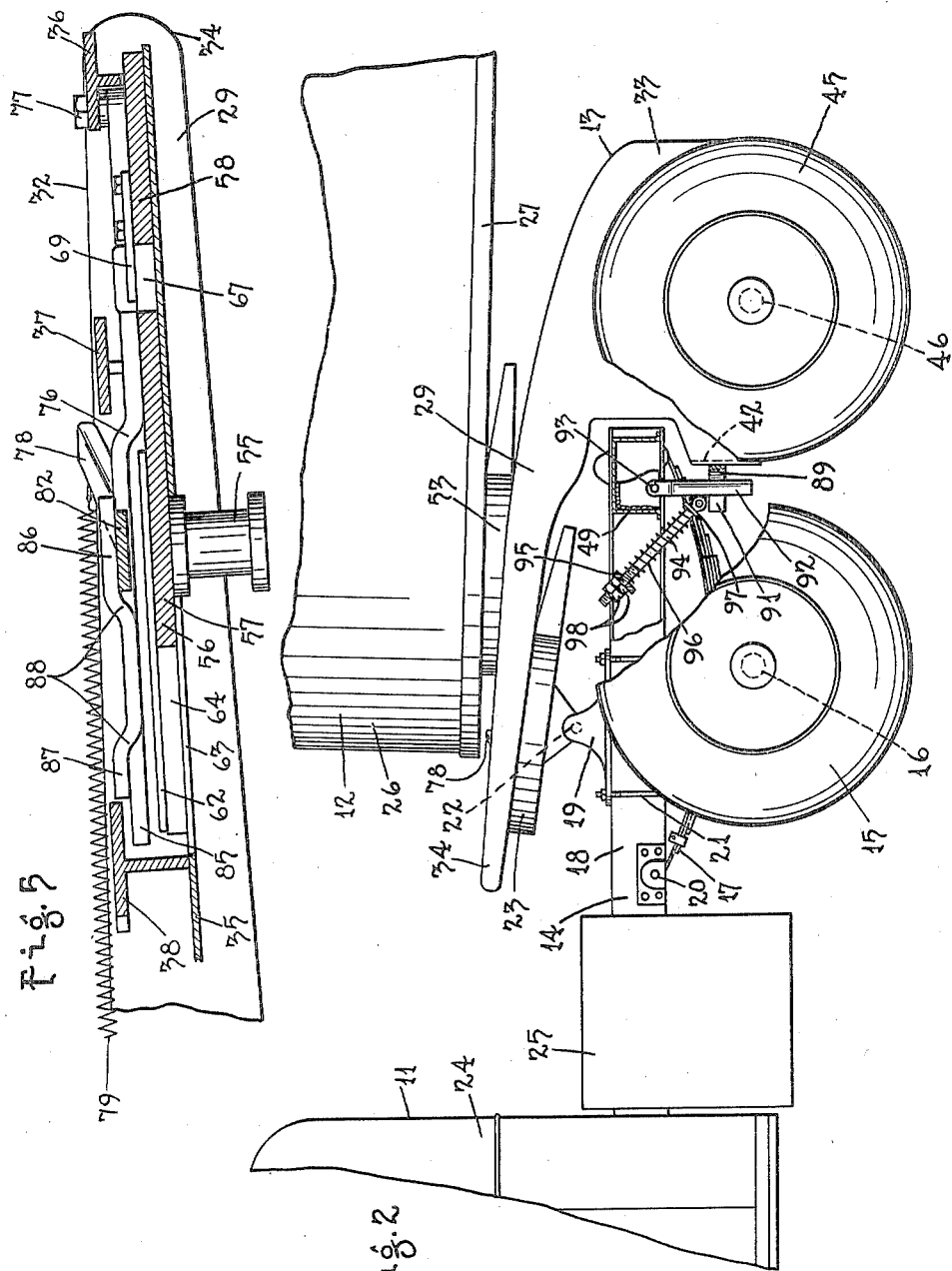

Jan. 31, 1950     E. K. PETERSON     2,495,943
TRUCK
Filed Dec. 10, 1945     3 Sheets-Sheet 3
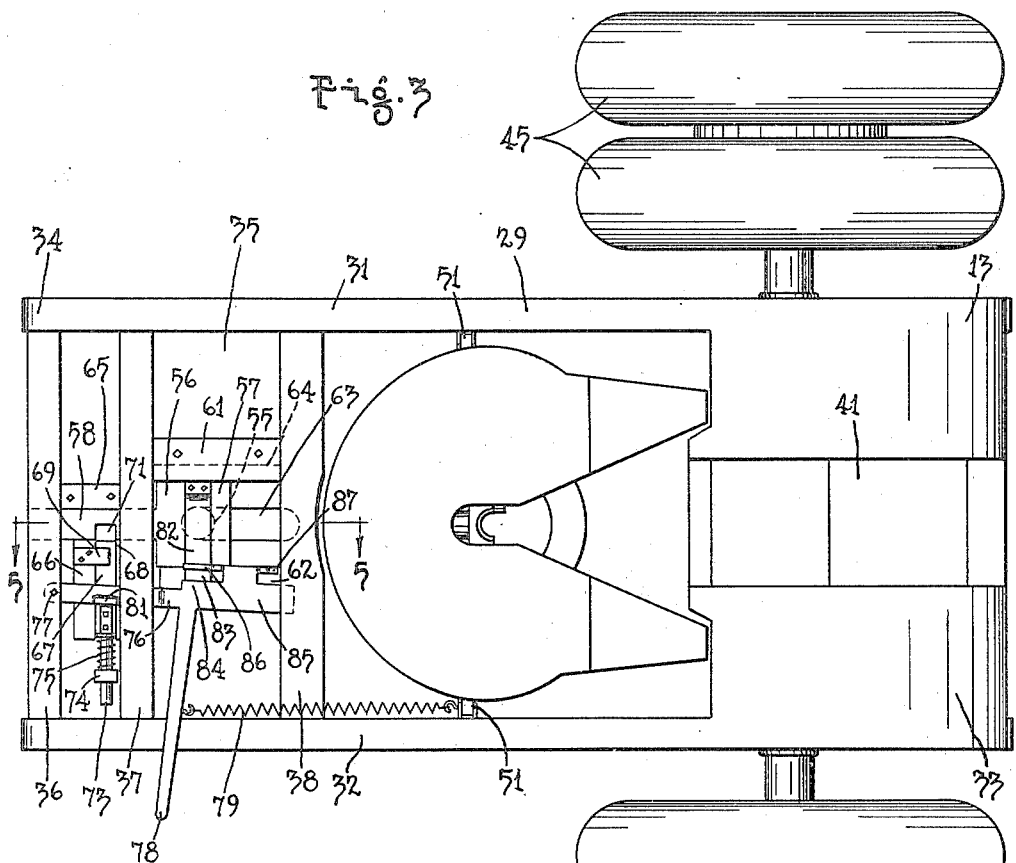
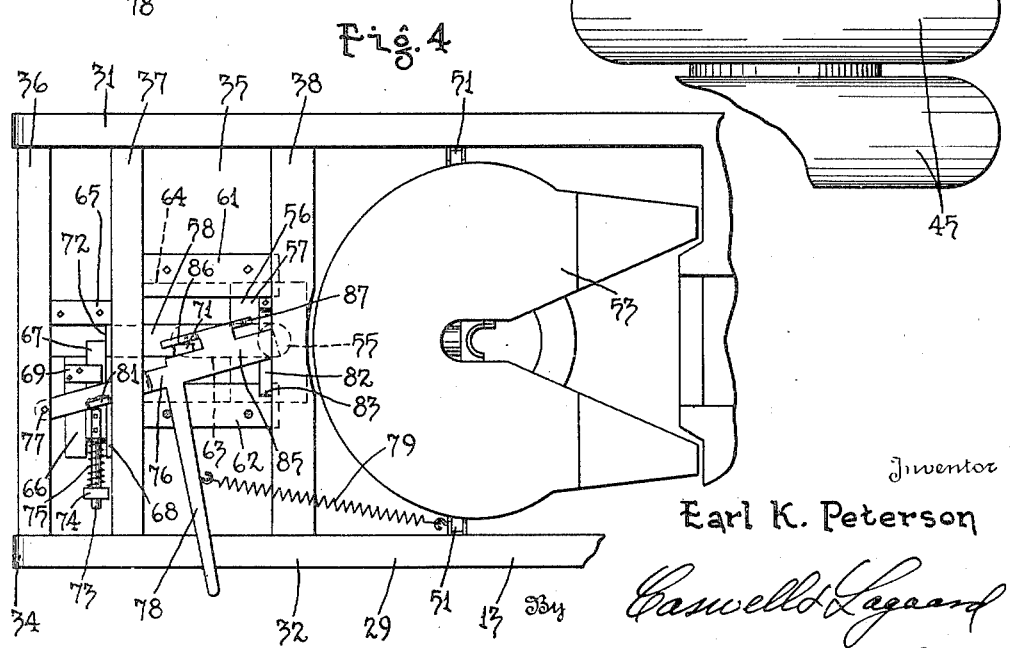
Inventor
Earl K. Peterson Patented Jan. 31, 1950

2,495,943

UNITED STATES PATENT OFFICE 2,495,943

TRUCK

Earl K. Peterson, Valley City, N. Dak.

Application December 10, 1945, Serial No. 633,975

6 Claims. (Cl. 280—33.05)

My invention relates to trucks employing a tractor, a trailer and a semi-trailer and has for an object to provide a construction by means of which the movement of the trailer and semi-trailer may be more positively controlled when the truck and trailer are backed up.

Another object of the invention resides in providing a construction whereby when the trailer is to be backed up, the wheels of the semi-trailer are brought into close position with respect to the wheels of the truck, so as to cause the wheels of the semi-trailer to travel more closely in the same circle as the wheels of the truck.

Another object of the invention resides in providing means for locking the semi-trailer from lateral movement with respect to the tractor when the wheels of the semi-trailer are disposed in proximity to the wheels of the tractor.

Another object of the invention resides in providing a construction whereby the semi-trailer may be locked from longitudinal movement in either its normal forward operating position or in its backing-up position.

An object of the invention resides in constructing the semi-trailer with a longitudinally movable king pin adapted to engage the fifth wheel of the truck.

Other objects of the invention reside in the novel combination and arrangement of parts and in the details of construction hereinafter illustrated and/or described.

In the drawings:

Fig. 1 is a side elevational view of a portion of a truck, trailer and a semi-trailer illustrating an embodiment of my invention and with the semi-trailer in normal forward traveling position.

Fig. 2 is a view similar to Fig. 1 showing the semi-trailer in position for backing.

Fig. 3 is a plan view of the semi-trailer shown in Fig. 1 illustrating the king pin in normal forward operating position.

Fig. 4 is a view similar to Fig. 3 showing the king pin in backing-up position.

Fig. 5 is an elevational sectional view taken on line 5—5 of Fig. 3 and drawn to a greater scale.

For the purpose of illustrating my invention, I have shown a truck which includes a tractor 11, a trailer 12 and a semi-trailer 13. Since both tractors and trailers are well known in the art, only so much of these vehicles as becomes necessary to illustrate the instant invention have been shown in the drawings. These various parts will now be described in detail.

The tractor 11 includes a chassis 14 which has front supporting wheels, not shown, and rear supporting wheels 15. These wheels are mounted upon an axle 16 carried by springs 17 and driven from the engine of the tractor in the customary manner. The chassis 14 includes longitudinal frame members 18 and to which the springs 17 are secured by means of shackles 20. The said chassis further includes a box-like transverse frame member 49 which is secured to the longitudinal frame members near the ends thereof, as shown in Fig. 2.

In addition, the said frame members support bearings 19 which are bolted thereto by means of bolts 21 and which have pivotally attached to them at 22 a fifth wheel 23 of the ordinary construction. In the drawings, a portion of the cab 24 of the tractor is also shown, as well as the gasoline tank 25.

The trailer 12 consists primarily of a body 26 which, in the form illustrated, is merely a box in which the freight to be hauled is placed. This body includes a bottom 27 which is provided with a king pin 28 at the forward portion of the same. The trailer 12 is supported by means of rear wheels or a suitable truck which has not been shown in the drawings, but which may be of conventional form and design.

The semi-trailer 13 is best shown in Figs. 1, 2, 3 and 4, and comprises a frame structure 29 having two longitudinally extending frame members 31 and 32. These frame members have depending portions 33 and forwardly extending portions 34. The forward portions 34 of the two frame members 31 and 32 are connected together by means of a plate 35, best shown in Fig. 5, and a number of transverse frame members 36, 37 and 38. The depending portions 33 of said frame members are connected together by means of plates 41 and other frame members forming a box-like structure at the rearward portion of the trailer. A transverse frame member 42, located at the forward portion of the depending portions 33 of frame members 31 and 32, serves a purpose to be presently more fully described. Another plate 43 having a recess 44 formed therein lies at the bottom of the portions 33 and serves a purpose to be presently described.

The semi-trailer 13 includes supporting wheels 45 which are mounted upon an axle 46. This axle is supported by means of springs 47 which are attached to the plate 43 of the frame 29 by means of shackles 48. All of the parts of the frame structure 29 of the semi-trailer 13 may be welded together or secured to one another in any suitable manner. Since the particular way in which these parts are secured together does not form any particular feature of the invention, the parts have been illustrated as having been welded.

Secured to the two frame members 31 and 32 of the frame structure 29 are bearings 51. These bearings support a transverse shaft 52. A fifth wheel 53 overlies the semi-trailer frame structure at this locality and has lugs 54 depending therefrom and which are journaled on the shaft 52. By means of this construction, the fifth wheel 53 is mounted on the semi-trailer 13. The king pin 28 on trailer 12 is adapted to engage this fifth wheel and cooperates therewith in the customary manner.

In conjunction with the fifth wheel 23, a movable king pin 55 is employed which is best shown in Fig. 5. This king pin is welded to the under side of a slide 56 which rests upon the plate 35 of the frame structure 29. The slide 56 has a body portion 57 and a neck 58 extending outwardly therefrom. The body portion 57 is guided between two guides 61 and 62 which are attached to the plate 35. The king pin 55 travels in a slot 63 formed in the plate 35. The guides 61 and 62 are constructed with grooves 64 in which the edges of the body portion 57 slide and by means of which the said body portion is held in position upon the plate 35. The neck 58 of the slide 56 is similarly guided by means of a guide 65 on one side of the same and another guide 66 on the other side of said neck which extends for but a short distance along the said neck.

For holding the slide 56 in either of two positions, a bolt 67 is employed. This bolt is guided for movement along the guide 66 and along another guide 68 also attached to the plate 35 and which serves in conjunction with the guide 66 to further guide the neck 58 of the slide 56. Bolt 67 is held in position by means of a finger 69 attached to guide 66 and which overlies said bolt. The bolt 67 is adapted to enter into a slot 71 disposed in the neck 58 of slide 56 when the king pin 55 is in the position shown in Fig. 3. When said king pin is at the other end of the slot 63, and in the position shown in Fig. 4, the bolt 67 engages the end 72 of the neck 58 of slide 56 and holds the same in position. The bolt 67 has secured to it a rod 73 which slides through a bearing 74 secured to the plate 35. A compression coil spring 75 encircles this rod and is seated at one end against the bearing 74 and at its other end against the bolt 67. By means of this construction, the bolt is urged toward the slide 56 and into engagement with either the slot 71 or the end 72 of the slide 56.

For controlling the movement of the king pin 55, a lever 76 is employed. This lever passes beneath the three transverse frame members 36, 37 and 38 and is pivoted to the frame member 36 by means of a bolt 77. The said lever has a handle 78 extending outwardly from the same and at substantially right angles thereto which projects outwardly beyond the frame structure 29, where the said handle may be readily manipulated. A tension coil spring 79, anchored at one end to handle 78 and at its other end to the bearing 51, serves to move said lever in a counter-clockwise direction, as viewed in Figs. 3 and 4. The lever 76 has an abutment 81 which engages the end of the rod 73 attached to bolt 67 and which serves to retract said bolt when the handle 78 is moved toward the left, as shown in Fig. 3.

Once the lever 76 has been moved toward the position shown in Fig. 3, the same remains in this position to permit of shifting the king pin 55 and until said king pin has been moved to its other position. This is accomplished by means of a construction now to be described in detail. Attached to the body portion 57 of slide 56 is an arm 82 which is offset upwardly therefrom and which is parallel thereto. The end 83 of this arm lies substantially in the plane of a shoulder 84 formed on the lever 76 when the said lever is in normal position. This construction holds the said lever in its position shown in Fig. 3 and against the action of the spring 79. In this position, the bolt 67 is retracted from the neck 58 of slide 56 and the king pin is free to move. Formed on the rearward end 85 of lever 76 are two cams 86 and 87. These cams are adapted to contact with the arm 82 and when the cam surface 88 of either thereof engages the said arm, the portion 85 of lever 76 is lifted and the shoulder 84 moved out of engagement with the end 83 of arm 82. This permits the lever 76 to swing to the position shown in Fig. 4 and also permits the bolt 65 to be urged by means of the spring 75 into its latching position. These cam surfaces 88 are so positioned that the lever 76 is freed from the arm 82 when the slide 78 has been moved sufficiently to bring the bolt 67 out of register with the slot 71 or the end 72 of neck 58.

When the semi-trailer is moved to its forward position, as shown in Fig. 2, the same is locked from swinging movement relative to the tractor 11. This permits of more readily backing up the tractor and trailer and is accomplished by means of a construction best shown in Fig. 2. Secured to the plate 42 forming a portion of the frame structure 29 of the semi-trailer 13 is a U-shaped locking member 89 which has a forwardly extending notch 91 formed therein. Cooperating with this notch is a key 92 in the form of a rod which is pivoted to the transverse frame member 49 of the chassis 14 of tractor 11, as indicated at 93. The key 92 has pivoted to it at a locality above the locking member 89 an upwardly extending rod 94 which is slidably mounted in a bracket 95 secured to the chassis 14 of tractor 11. A compression coil spring 96 encircles this rod and bears at one end against the bracket 95 and at its other end against a collar 97 mounted on said rod. This spring urges the key 92 to its position shown in Fig. 2 in which the same lies within the notch 91 of the locking member 89, which movement is terminated by means of two nuts 98 screwed upon the end of the rod 94. In the event that the semi-trailer is pushed beyond its limits in the movement of the same toward the tractor or the key 92 is not received in the notch 91, the key 92 moves forwardly against the pressure of the spring 96, thereby yielding and preventing breakage of the same.

The operation of the invention is as follows: When the tractor 11 is moved forwardly, the semi-trailer 13 is disposed as shown in Fig. 1 and the same swivels on the fifth wheel 23 when the tractor and trailer are passing about a curve. Also, the trailer swivels on the fifth wheel 53. When trailers and tractors utilizing a semi-tractor and when constructed in the ordinary manner, are backed up, the semi-trailer frequently jackknifes, thus preventing proper reverse movement of the trailer. With my invention in the normal position, the king pin 55 is at its forwardmost position in slot 63 as shown in Fig. 3 and the lever 76 is in the position shown in Fig. 4. The bolt 67, in such position, engages the slot 71 and holds the king pin from longitudinal movement.

When it is desired to back up the truck, the lever 76 is swung in a clockwise direction, which is accomplished by moving the handle 78 forwardly. This brings shoulder 84 of said handle opposite the end 83 of arm 82 and through the weight of the said lever and handle, said lever drops into a position in which the same engages said arm. This holds the lever in the position shown in Fig. 3. At the same time, the abutment 81 forces the bolt 67 out of engagement with slot 71 and the slide 56 is now free to move. At this time, the truck may be backed up and since the trailer and semi-trailer are stationary, the forwardly extending portions 34 of the frame structure 29 slide upon the fifth wheel 23 from the position shown in Fig. 1 to that shown in Fig. 2. Also, the slide 56 slides from its position shown in Fig. 3 to that shown in Fig. 4 moving the king pin from the forward end of the slot 63 to the rearward end thereof. When the slot 71 in neck 58 has passed the end of the bolt 67, cam 86 disengages lever 76 from arm 82 and the said lever moves into the position shown in Fig. 4. The bolt 67 is now free to enter in front of the neck 58 when the slide 56 reaches its rearmost position, as shown in Fig. 4. When the parts are so disposed, the semi-trailer is locked from lateral movement by means of the key 92 which has entered into the notch 91 in the locking member 89. In this position, the wheels of the semi-trailer have been brought relatively close to the wheels of the tractor. When so positioned, the trailer may be backed up as if the semi-trailer were not present, since jack-knifing of the same becomes impossible. With the wheels of the semi-trailer brought up closely to the wheels of the trailer, side-swiping of the semi-trailer wheels is reduced to a minimum and the wear of the tires of the wheels on the tractor and semi-trailer is greatly reduced. When it is desired to again travel forward, lever 78, which occupies the same position as shown in Fig. 4, is again moved to its position shown in Fig. 3 and held in such position by the arm 82. This frees the bolt 67 from engagement with the end of the slide 56. By now moving the tractor forwardly, the slide 56 is moved forwardly. As soon as the end 72 of the neck 53 passes the bolt 65, lever 76 is now released by means of cam 87 and the same again assumes the position shown in Fig. 4. Upon the king pin 55 arriving at the forward end of the slot 63, bolt 67 snaps into the slot 71 and locks the king pin in position.

The advantages of my invention are manifest. By means of the construction employed, jack-knifing of the semi-trailer is prevented when the tractor is backed up. By bringing the wheels of the semi-trailer close to the wheels of the tractor, side-swiping of the tractor and trailer wheels is materially reduced. With my invention, trailers employing semi-trailers can be successfully backed up. My improved construction can be employed with semi-trailers with a minimum of alteration thereof. My improved construction is easy to operate, being merely required to manipulate the same lever in the same manner whether the trailer is to be moved forwardly or rearwardly. After the lever has been manipulated, shifting of the king bolt is automatically accomplished by operating the tractor in the proper direction and locking of the king bolt in position is automatically accomplished when the same reaches its proper position. My invention is fool-proof in construction and requires a minimum of ingenuity and effort to operate.

Changes in the specific form of my invention, as herein described, may be made within the scope of what is claimed without departing from the spirit of my invention.

Having described my invention, what I claim as new and desire to protect by Letters Patent is:

1. In combination with the fifth wheel of a tractor, a semi-trailer having a frame structure overlying said fifth wheel, a slide mounted on said frame structure and guided for longitudinal movement relative thereto, a king pin carried by said slide for cooperation with said fifth wheel, said slide being moved along said guide upon relative movement of said tractor and semi-trailer to change the longitudinal spacing of the wheels of said semi-trailer and tractor, a bolt movable transversely of said slide and latching means on said slide for engagement with said bolt to hold said slide and king pin from longitudinal movement relative to the frame structure, a lever for retracting said bolt from engagement with said slide, locking means operated by the slide for holding said lever in bolt-retracting position and means operated by said slide for releasing said lever when the latching means of the slide is out of register with said bolt.

2. In combination with the fifth wheel of a tractor, a semi-trailer having a frame structure overlying said fifth wheel, a slide mounted on said frame structure and guided for longitudinal movement relative thereto, a king pin carried by said slide for cooperation with said fifth wheel, said slide being moved along said guide upon relative movement of said tractor and semi-trailer to change the longitudinal spacing of the wheels of said semi-trailer and tractor, a bolt movable transversely of said slide and latching means on said slide for engagement with said bolt to hold said slide and king pin from longitudinal movement relative to the frame structure, a lever for retracting said bolt from engagement with said slide, locking means operated by the slide for holding said lever in bolt-retracting position and cam means rendered operable upon movement of the slide for freeing said lever when the bolt is out of register with said latching means.

3. In combination with a tractor, a semi-trailer pivotally connected to said tractor, guide means for guiding said tractor and semi-trailer for relative longitudinal movement to vary the distance between the wheels of the semi-trailer and tractor, a locking member on said semi-trailer, a second locking member on said tractor for engagement with said locking member on said trailer the locking member on said semi-trailer being disposed rearwardly of and in the path of movement of the locking member on said tractor and being adapted to be brought into operative relation with the locking member on said tractor when the wheels of the tractor are moved toward the wheels of the semi-trailer.

4. In combination, a tractor having rear driving wheels and a fifth wheel, a semi-trailer having a frame structure and supporting wheels trailing the driving wheels of said tractor, a support on said semi-trailer, means acting between said frame structure and support and guiding said support for longitudinal movement relative to said frame structure, and a king pin on said support for cooperation with said fifth wheel, said support when in a forward position causing spacing of said wheels a distance sufficient to accommodate articulation of the truck and semi-trailer when traveling in a forward direction, said support when in a rearward position bringing said wheels in juxtaposition to accommodate backing of the tractor and semi-trailer.

5. In combination, a tractor having rear driving wheels and a fifth wheel, a semi-trailer having a frame structure and supporting wheels trailing the driving wheels of said tractor, a support on said semi-trailer, means acting between said frame structure and support for guiding said support for longitudinal movement relative to said frame structure, a king pin on said support for cooperation with said fifth wheel, said support when in a forward position causing spacing of said wheels a distance sufficient to accommodate articulation of the truck and semi-trailer when traveling in a forward direction, said support in a rearward position bringing said wheels in juxtaposition to accommodate backing of the tractor and semi-trailer, and locking means for restraining articulation between said tractor and semi-trailer when said support is in rearward position.

6. In combination, a tractor having rear driving wheels and a fifth wheel, a semi-trailer having a frame structure and supporting wheels trailing the driving wheels of said tractor, a support on said semi-trailer, means acting between said frame structure and support for guiding said support for longitudinal movement relative to said frame structure, a king pin on said support for cooperation with said fifth wheel, said support when in a forward position causing spacing of said wheels a distance sufficient to accommodate articulation of the truck and semi-trailer when traveling in a forward direction, said support when in a rearward position bringing said wheels in juxtaposition to accommodate backing of the tractor and semi-trailer, and locking means for holding said support in either of its extreme positions.

EARL K. PETERSON.

REFERENCES CITED

The following references are of record in the file of this patent:

UNITED STATES PATENTS

| Number | Name | Date |
|---|---|---|
| 1,995,920 | Gurton et al. | Mar. 26, 1935 |
| 2,330,897 | Kirksey | Oct. 5, 1943 |